(12) United States Patent
Tran et al.

(10) Patent No.: US 10,706,239 B1
(45) Date of Patent: Jul. 7, 2020

(54) INTEGRATED LABEL PRINTER AND BARCODE READER, AND RELATED SYSTEMS AND METHODS

(71) Applicant: Amazon Technologies, Inc., Seattle, WA (US)

(72) Inventors: Benny Tran, Seattle, WA (US); Feng Liu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/220,101

(22) Filed: Dec. 14, 2018

(51) Int. Cl.
| | |
|---|---|
| *G06K 7/10* | (2006.01) |
| *G06K 1/12* | (2006.01) |
| *G06K 19/06* | (2006.01) |
| *B65B 61/26* | (2006.01) |
| *B65C 9/46* | (2006.01) |
| *B65C 11/02* | (2006.01) |

(52) U.S. Cl.
CPC ............ *G06K 1/121* (2013.01); *B65B 61/26* (2013.01); *B65C 9/46* (2013.01); *B65C 11/0289* (2013.01); *G06K 19/06028* (2013.01)

(58) Field of Classification Search
CPC ........... G06K 7/10881; G06K 7/10693; G06K 7/10851
USPC .................................................. 235/462.43
See application file for complete search history.

(56) References Cited

U.S. PATENT DOCUMENTS

| | | | | |
|---|---|---|---|---|
| 5,399,228 | A * | 3/1995 | Schroeder | B65C 1/021 |
| | | | | 156/542 |
| 8,167,017 | B2 * | 5/2012 | Kolp | B65C 9/1865 |
| | | | | 156/387 |
| 9,802,728 | B1 * | 10/2017 | Rodgers | B65C 9/40 |
| 9,809,343 | B2 * | 11/2017 | Bowers | B65C 1/021 |
| 2006/0082446 | A1 * | 4/2006 | Dods | B65C 9/1884 |
| | | | | 340/10.51 |
| 2006/0218881 | A1 * | 10/2006 | Sperry | B65B 9/02 |
| | | | | 53/411 |

OTHER PUBLICATIONS

"3600 Printer Applicator Maintenance & Service Manual"; CTM Labeling Systems; Revision 3600-2b5; 186 pages.
"DATAMAN 150/152/260/162 Series Barcode Readers"; Cognex; © 2015; 4 pages.
"Zebra® ZE500™ Series Print Engine"; Zebra Technologies; © 2014; 2 pages.

* cited by examiner

*Primary Examiner* — Ahshik Kim
(74) *Attorney, Agent, or Firm* — BakerHostetler

(57) ABSTRACT

A labeling device includes a printer configured to print labels each having a barcode on a print side of the label opposite an adhesive side of the label. The printer is also configured to direct each printed label in a direction of travel. The device includes a label applicator located downstream of the printer with respect to the direction of travel. The device also includes a barcode scanner that is located downstream of the printer with respect to the direction of travel and is configured to scan the barcode of each label before the label applicator presses the label against the package.

20 Claims, 6 Drawing Sheets

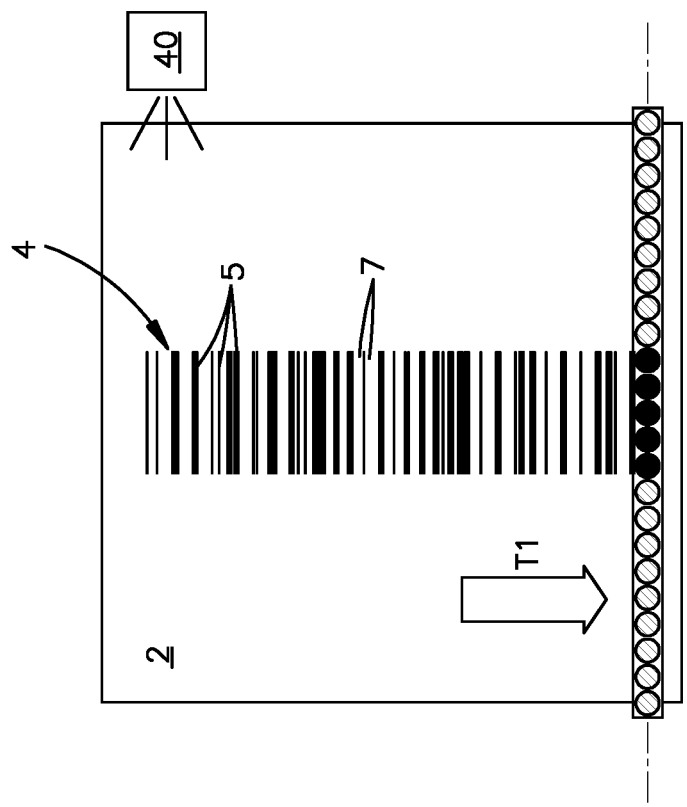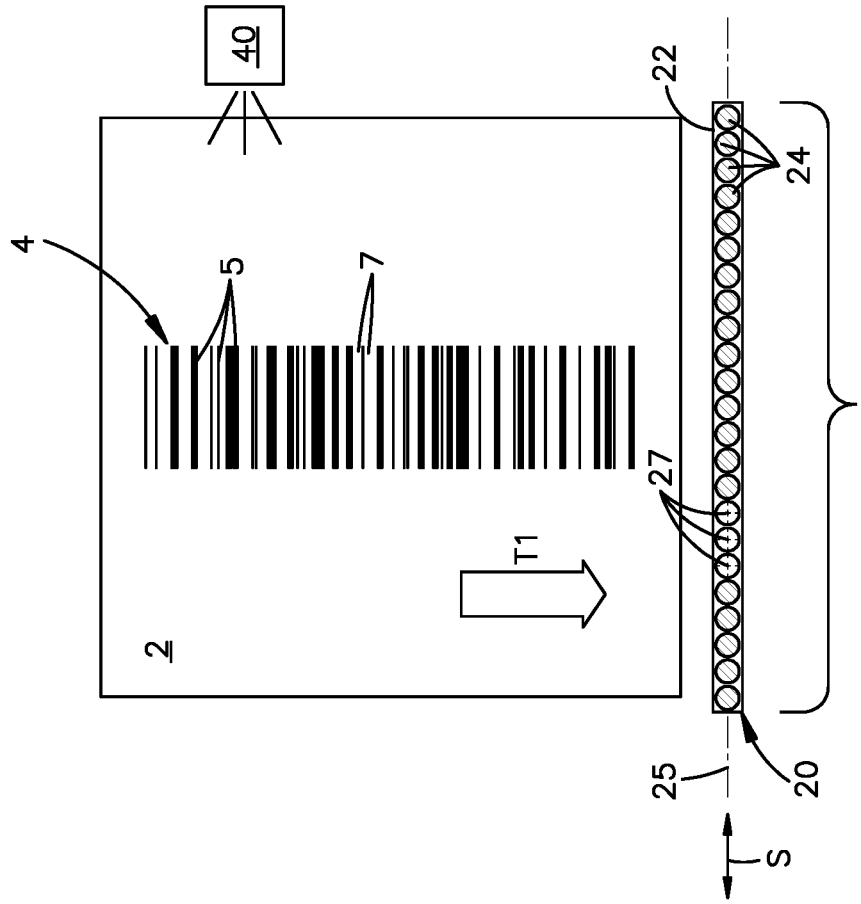

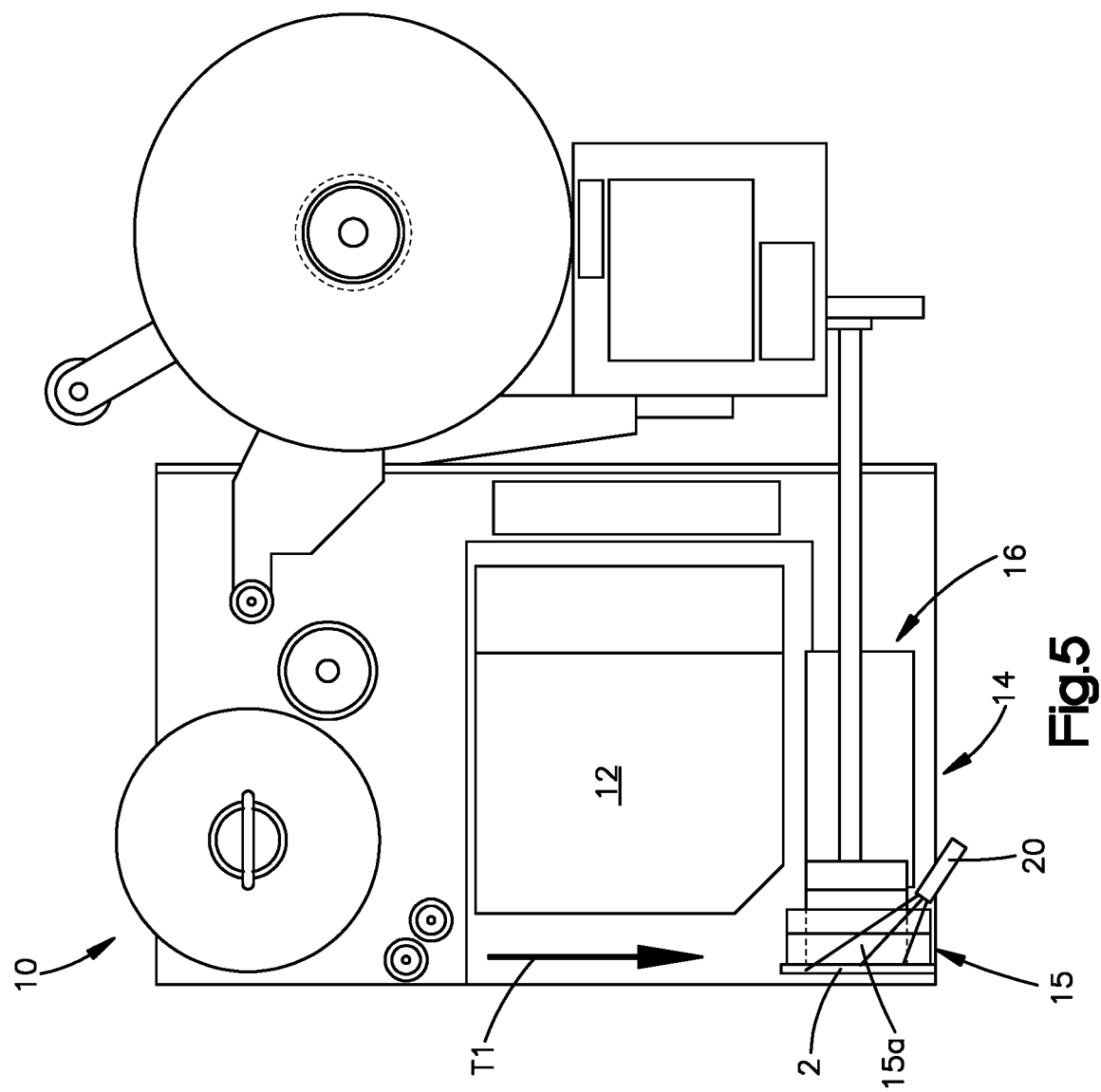

INTEGRATED LABEL PRINTER AND BARCODE READER, AND RELATED SYSTEMS AND METHODS

BACKGROUND

The present invention relates to barcode printing and scanning devices, and in particular an autonomous labeling device capable of printing a barcode on a label and scanning the printed barcode for an accuracy verification before the label is applied to a package.

In a materials handling facility, such as an order fulfillment center, multiple customer orders are received, where each order specifies one or more items from inventory (which may also be referred to as stock storage) to be shipped to the customer that submitted the order. To fulfill the customer orders, a fulfillment center control system (also referred to herein as a "control system"), such as a type having a processor executing warehouse management software, can instruct operators regarding a location within the fulfillment center where the one or more items specified in each customer order is stored in inventory. Under direction of the control system, the one or more items can be retrieved or "picked" from inventory, singulated, and then inducted into a conveyance mechanism that routes the items to particular destinations, such as sorting stations, in accordance with the customer orders currently being processed. In this process, the control system assigns each picked item a unique identification that is associated with the customer order for which the item was picked. The control system instructs the conveyance mechanism and any human operator(s) therein to direct each picked and singulated item to a designated destination within the materials handling facility, such as to a designated sorting station where items are organized (such as into containers) into units of items based on their respective customer orders, and onward to an order processing station, such as a packing station. It is to be appreciated that each sorted unit of items can have a single item (such a unit can be referred to as a "single") or a plurality of items (such a unit can be referred to as a "multi"), depending on the respective customer order.

At the packing station, units of items for customer orders are processed, packed, and labeled for shipping to the customers. For each package, a shipping label typically displays data, such as a shipment identification encoded in a barcode printed on the label. In a native format, the shipment identification (also referred to herein as a "shipment ID") can be represented as a series of alpha-numeric characters that are assigned by the control system and linked by the control system with order shipment information (such as the customer's name and delivery address) stored in computer memory accessible by the processor of the control system. The control system can also associate the shipment ID with additional order processing information, such as warehouse routing information for subsequent routing within the fulfillment center, as discussed further below. Thus, the barcodes on the shipping labels convert native source data sets, such as the alpha-numeric shipment IDs, into encoded data, particularly "barcode data."

As used throughout the present disclosure, the term "barcode" means a visual representation of information in a machine-readable format presented on a surface that can be optically scanned. Barcodes can be categorized as one-dimensional (1D), two-dimensional (2D), or three-dimensional (3D). Also, as used herein with reference to barcodes, the shortened terms "readable", "readability", and their derivatives mean "machine-readable", "machine-readability", and similar such derivatives, respectively.

1D barcodes, also referred to as "linear barcodes", can be scanned along a single line that traverses the barcode, and typically visually represent the information in parallel lines and spaces having varying widths. Non-limiting examples of 1D barcodes include UPC ("Universal Product Code"), EAN ("European Article Numbers", including EAN-8 (eight digits) and EAN-13 (thirteen digits)), Code128, and ITF-13 barcodes.

2D barcodes, also referred to as "matrix barcodes", visually represent the information in a 2D array of geometric patterns, such as black and white squares, which requires scanning the 2D array. Non-limiting examples of 2D barcodes include QR code, Data Matrix, and PDF417 barcodes.

3D barcodes can be characterized as a 1D or 2D barcode that employs texture, such as the depth and/or height of a barcode character relative to the scan surface, as the additional dimension. For example, a 3D barcode can be conceptualized of as a 1D or 2D barcode engraved or embossed directly onto the surface of an item (such as a product, product packaging, or shipment packaging). Such barcodes can be scanned by a laser scanner that also measured the time for each beam to reflect from the textured barcode and return to the scanner. The scanner uses the aforementioned time measurement to calculate barcode character "depth". It is to be appreciated that a 1D barcode that employs texture as an additional dimension would typically be referred to as a "3D barcode," even if it technically requires scanning in only two dimensions.

Downstream of the packing station, the control system typically uses the barcode data, particularly the encoded shipment ID, to route the package along additional conveyance to further downstream processes and/or locations within the fulfillment center, such as to a staging destination associated with a particular delivery zip code. At the staging destination, the package can be palletized or otherwise bundled with other packages for loading onto a delivery vehicle for further delivery, such as to a shipping warehouse or to a public or private carrier for finally shipping the package to the customer address. The barcode data (e.g., the encoded shipment ID), which can include a five- or nine-digit zip code, for example, can also be scanned by the carrier(s) at one or more steps before, during, or at the conclusion of delivery to the customer. Such scans are typical in delivery processes or services that offer delivery tracking.

Because processes within the fulfillment center that are downstream of the packaging station (and possibly employed by the carrier) can rely upon the barcode data for accurate package routing and delivery, it is important that the barcode is printed accurately.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 3A shows a plan view of barcode scanning elements oriented in relation to the barcode of a shipping label printed in a first format, according to an embodiment of the present disclosure;

FIG. 3B shows a plan view the barcode scanning elements in scanning alignment with a portion of the barcode illustrated in FIG. 3A;

FIG. 5 shows a side plan view of a labeling mechanism, according to another embodiment of the present disclosure.

DETAILED DESCRIPTION

The embodiments of the present disclosure pertain to labeling devices, particularly high-speed, high-volume labeling devices that include a printer that prints barcodes onto labels (such as shipping labels), a label applicator (such as a tamp head) that applies the printed labels to associated packages, and an integrated barcode scanner that scans each printed barcode for verifying its accuracy and/or machine-readability before the applicator applies the label to a package. Data from the integrated barcode scanner is analyzed by a processor, which interprets the data to verify whether each barcode is sufficiently accurate and/or machine-readable within system parameters and then instructs the labeling device whether to apply the label to the associated package or to reject the label and print a replacement label for application to the package.

The labeling devices described in the present disclosure provide significant advantages over prior art barcode labeling devices (particularly high-speed and/or high-volume barcode labeling devices) and the systems and processes that employ such barcode labeling devices. One non-limiting type of packaging system for which the labeling devices described herein are particularly useful is an autonomous or semi-autonomous item-packaging system of a type that inducts one or more items for packaging into a pre-package volume proximate a supply of packaging material that is mechanically fed to the pre-package volume, whereby the system mechanically manipulates the feed of packaging material into a fully-enclosed or semi-enclosed package construct around the one or more item, such as by folding or wrapping the packaging material around the one or more items, and applies a shipping label to the package construct before, during, or after the manipulating step. It is to be appreciated that the labeling devices described in the present disclosure can provide significant advantages for many other types of labeling and/or packaging systems, processes, and instrumentalities.

Figure 1:
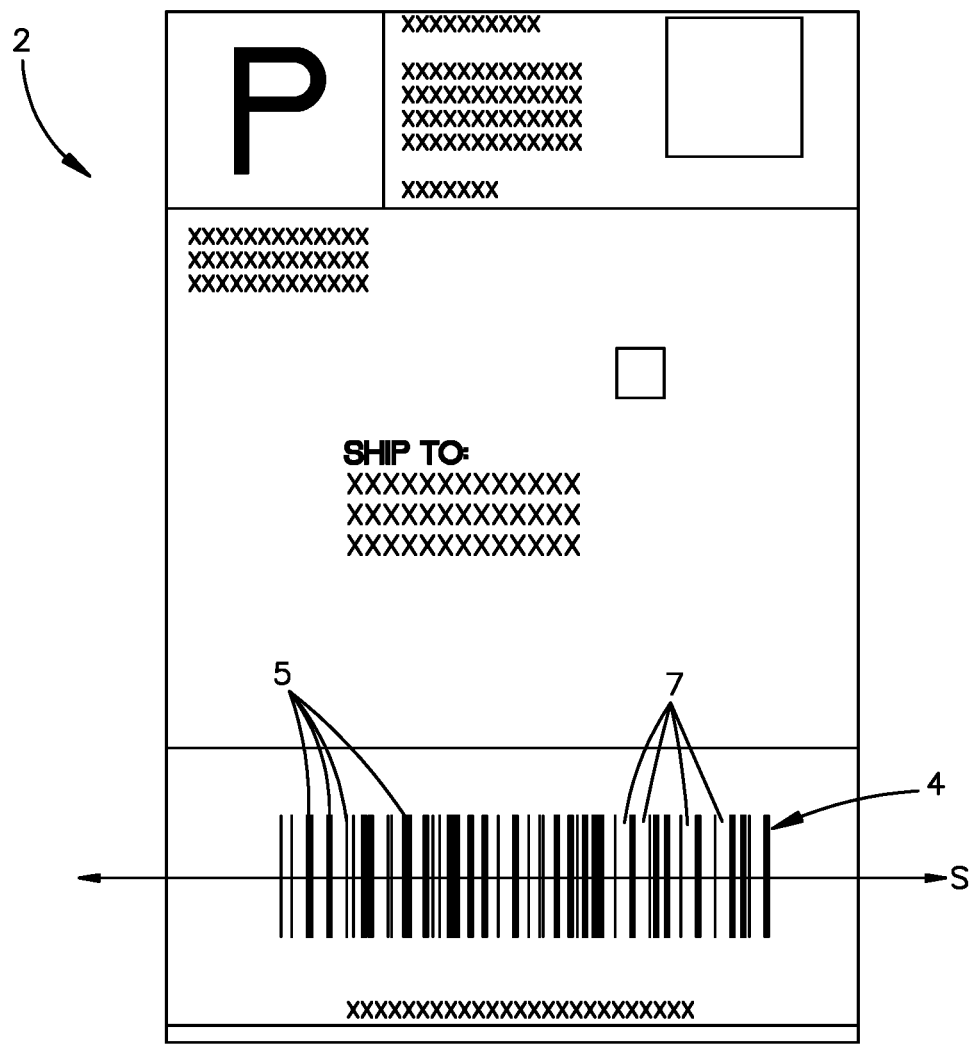
FIG. 1 shows a plan view of a shipping label having a barcode that encodes data relating to one or more associated items contained in a package.

Referring now to FIG. 1, an example shipping label 2 (which can be found in the prior art) having at least one barcode 4 is shown. In the depicted label 2, the barcode 4 of interest is a linear or 1D barcode having darkened (i.e., printed) lines 5 and intervening spaces 7 of varying thicknesses as measured along a linear scan direction S. It is to be appreciated that although the following exemplary labeling devices, systems, and methods for printing and scanning barcodes are described primarily with reference to such 1D barcodes as the barcode 4 shown in FIG. 1, other types of barcodes, including 2D and/or 3D barcodes, are within the scope of the present disclosure, as will be discussed in more detail below.

Figure 2A:
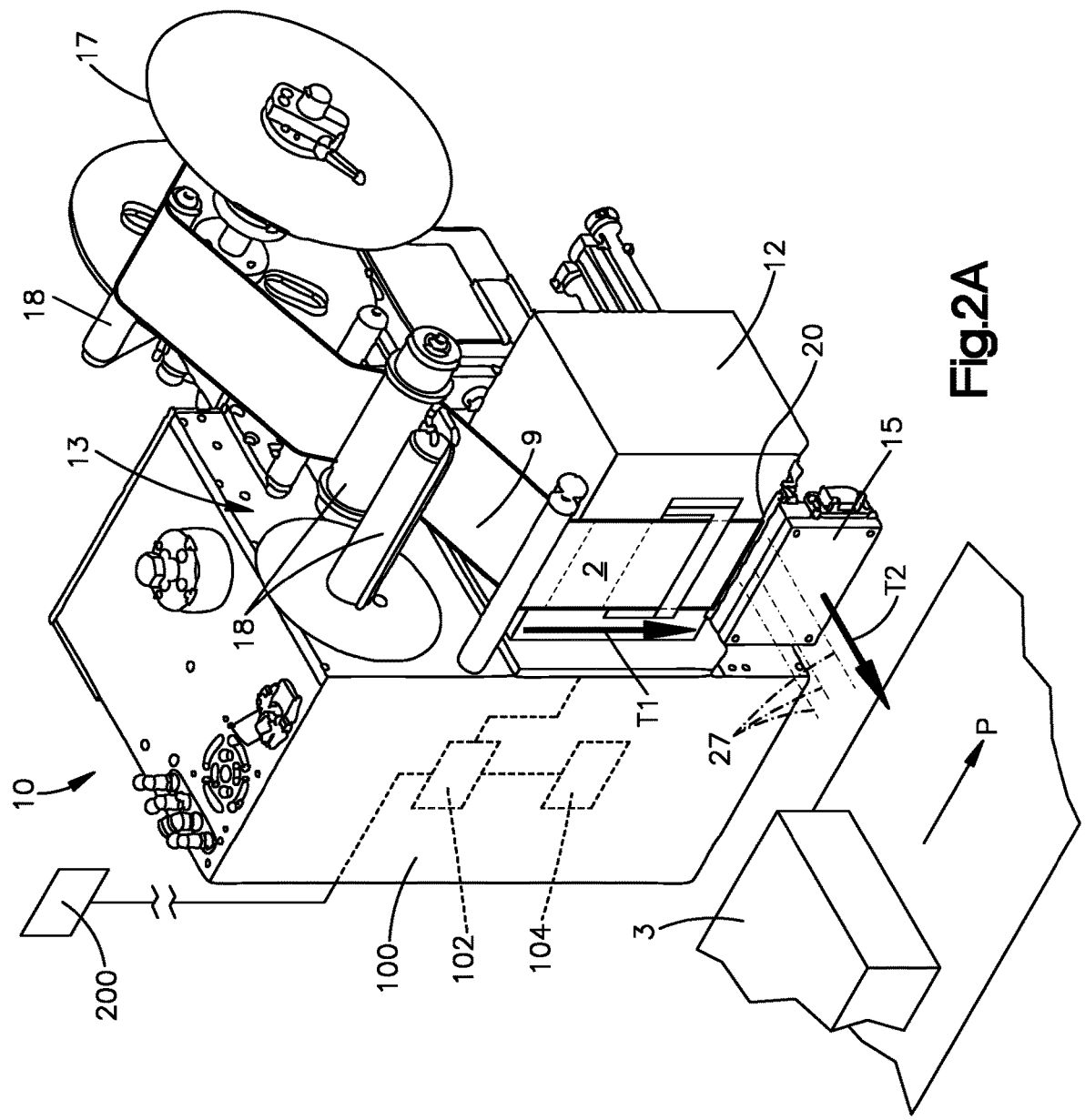
FIG. 2A shows a perspective view of a labeling mechanism, according to an embodiment of the present disclosure.
Figure 2B:
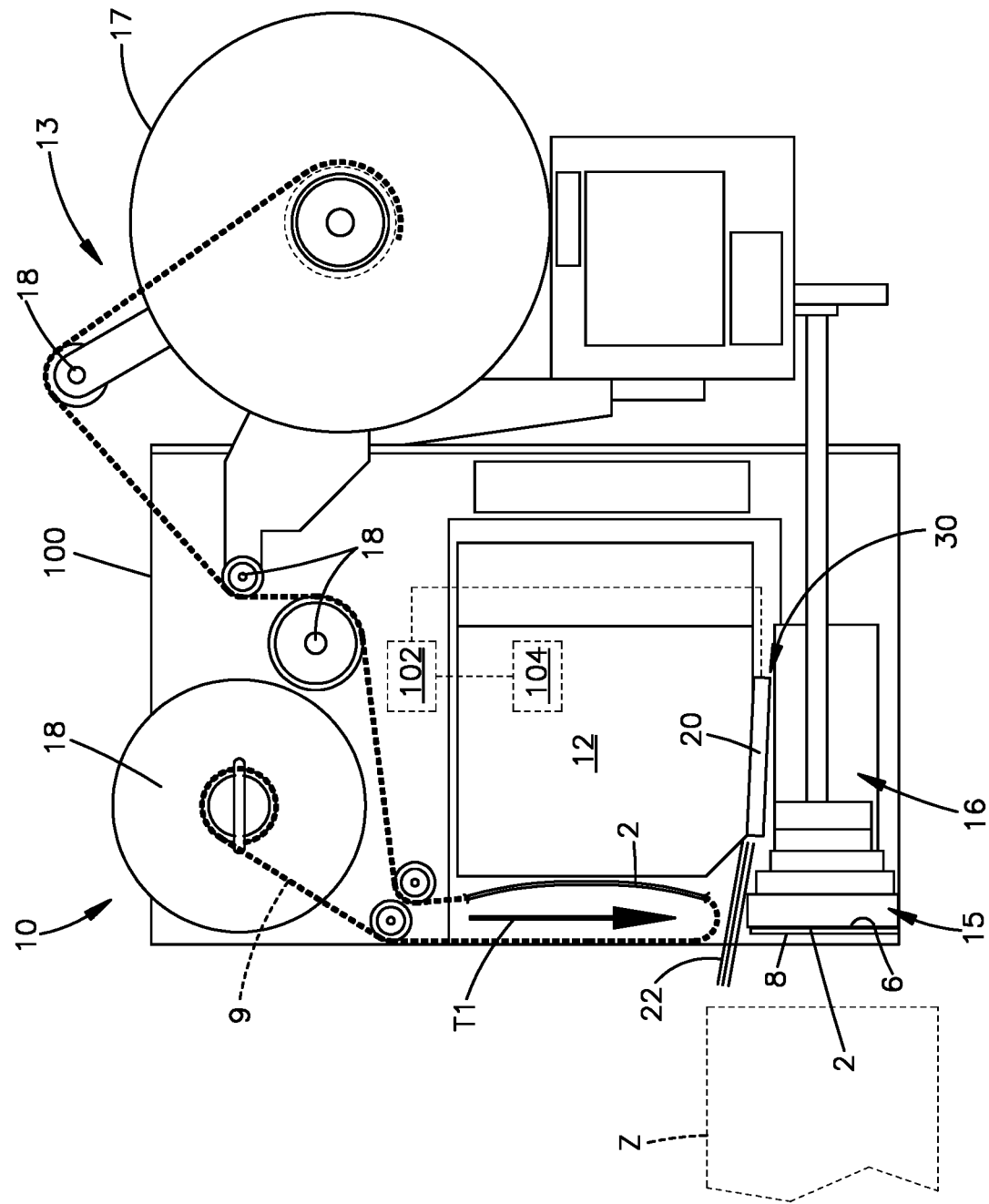
FIG. 2B shows a side plan view of the labeling mechanism illustrated in FIG. 2A.

Referring now to FIGS. 2A-2B, an example labeling device 10 of the present disclosure includes a print engine 12 (also referred to herein as a "printer" 12) that is configured to print shipping labels 2 each having barcodes 4, a label applicator 14 (also referred to herein as an "applicator" 14) that is configured to apply the printed labels 2 to associated packages 3 that are conveyed along a conveyor in front of the applicator 14 along a package feed direction P. The labeling device 10 includes an integrated scanning device 20 (also referred to herein as a "scanner" 20) that is configured to scan the barcodes 4 on the printed shipping labels 2 to verify the readability and/or accuracy of each barcode before the applicator 14 applies each barcode to its associated package 3, preferably without delaying the cycle speed of the printer 12 and/or the applicator 14, which are configured to print and apply labels 2 in rapid succession, particularly in high-volume labeling processes. The labeling device 10 can be characterized as an integrated barcode printing and scanning mechanism.

The labeling device 10 can include a control module 100 that is configured to control operation of the printer 12, the applicator 14, and the scanner 20. In particular, the control module 100 can include a module processor 102 that is in electrical communication with computer memory 104 and also in electrical communication with circuitry for controlling actuators or other operative components that respectively operate the printer 12, the applicator 14, and the scanner 20. The circuitry, or at least portions thereof, can reside within a housing 106 of the control module 100. It is to be appreciated that the module processor 102 is preferably in electronic communication with a fulfillment center control system 200 that transmits information to the module processor 102, such as information pertaining to the labels 2 (and thus the barcodes 4) to be printed by the printer 12. In other embodiments, the fulfillment center control system 200 can operate the control module 100 without use of the module processor 102. It is to be appreciated that operations described below as being performed by the module processor 102 can alternatively or additionally be performed by the fulfillment center control system 200.

The labeling device 10 can include a label feed assembly 13 (also referred to herein as the "feed assembly" 13) that advances or "feeds" labels 2 to the printer 12. The labels 2 can be supplied in a series on a ribbon 9 of substrate material (also referred to as "backing") that extends along a continuous line. Each label 2 has a print side 6 facing away from the underlying ribbon 9 and an adhesive side 8 that is opposite the print side 6 and adhered to the ribbon 9. The ribbon 9 can be initially carried on a supply roll or spool 17 and can be advanced along a plurality of rollers 18 to the printer 12. The printer 12 can include additional components for advancing the ribbon 9 through the printer 12, such as rollers, cams, and the like. The printer 12 includes a ribbon driver, such as a drive roller, by way of a non-limiting example, that controls a rate at which the ribbon 9 is advanced through the printer 12 during label printing, and can thus control the print rate of the printer 12.

The printer 12 prints the barcode 4 and optionally additional label information on the print side 6 of the ribbon 9 (and thus also on the print side 6 of the labels 2), and the printed label 2 is then advanced from the printer 12 toward the applicator 14 in a direction of travel T1. After it is printed, the label 2 is peeled from the ribbon 9 (such as at a transition location between the printer 12 and the applicator 14) and advanced to the applicator 14, while the de-labeled length of ribbon 9 is directed away from the printer 12. The adhesive side 8 of the labels 2 is configured to be affixed to packages 3 and thus includes a layer of adhesive material (also referred to as an "adhesive layer") or other means for affixation to the packages 3.

The applicator 14 includes a tamp head 15 that is connected to a tamp assembly 16 configured to drive the tamp head 15 in a tamp direction T2 toward packages 3 as they pass through, and thus at least momentarily reside within, a package labeling zone Z in front of the tamp head 15. The labels 2 are advanced from the printer to the tamp head 15 such that, as the tamp head 15, the print side 6 of the label 2 faces the tamp head 15 and the adhesive side 8 of the label 2 faces the package labeling zone Z. The tamp head 15 is configured to apply labels 2 to the associated packages 3 by contacting the print side 6 of each label 2 and driving the label 2 in the tamp direction T2 so that the adhesive side 8 of the label 2 contacts and adheres to the package 3. In this manner, the labels 2 are applied to the packages 3 with the print sides 6 (and thus the barcodes 4) facing outwards from the package 3 (i.e., displayed).

The scanner 20 is preferably an optical scanner configured to sense optical information, such as light intensity, within a field of view or "scan field" 22 extending from the scanner 20 along at least one scan axis 27. The scanner 20 is positioned and oriented so that its scan field 22 intersects the printed labels 2 either upstream of the tamp head 15 or while the printed labels 2 are in front of the tamp head 15 yet prior to being tamped toward the package 3. In this manner, the scanner 20 is configured to scan each barcode 4 to verify is readability and/or accuracy before the label 2 is applied to the associated package 3, which process is described in more detail below. Preferably, the scanner 20 is positioned and oriented to face the print side 6 of the labels 2, although the scanner 20 can alternatively be positioned and oriented to face the adhesive side 8 of the labels 2.

As shown in the embodiment illustrated in FIGS. 2A and 2B, the scanner 20 can be positioned and oriented so that the labels 2 pass through the scan field 22 at a label transition location downstream from the printer 12 and upstream from the tamp head 15 with respect to the direction of travel T1. Thus, the scanner 20 is configured to scan and verify the readability and/or accuracy of the barcodes 4 effectively as they are printed and in any case before they are applied to packages 3, and to do so without impeding or slowing the operational speed of the labeling device 10. Thus, the labeling device 10 can be characterized as being capable of printing and verifying barcodes 4 "in parallel" with each other. In this manner, the labeling device 10 can provide significant reductions in package labeling cycle times and throughput relative to prior art barcode printers that perform a barcode scan verification.

Moreover, the scanner 20 can be located in a narrow space 30 defined between the printer 12 and the tamp assembly 16. Locating the scanner 20 in this narrow space 30 provides a number of advantages, such as housing the scanner 20 in a substantially controlled environment that protects the scanner 20 from exposure to the potentially harmful environmental factors that can be encountered in a materials handling facility, such as, among other things, undesirable light exposure, debris (e.g., dirt), dust accumulating on the active scanning elements of the scanner 20, image distortion due to heat of nearby machine components, and inadvertent contact (e.g., bumping, jostling, and the like) from automated or human operators. These environmental factors can deleteriously affect the quality and accuracy of the scans performed by the scanner 20. Moreover, these factors can also damage elements of the scanner, causing scanner 20 downtime (and thus also downtime of the labeling device 10), such as for cleaning, repositioning, repairing, and/or replacing the scanner 20, which can lead to significant losses in system efficiency, productivity and profitability. Locating the scanner 20 in the confined space 30 between the printer 12 and the applicator 14 avoids or at least reduces exposure to the foregoing undesirable environmental factors. Additionally, locating the scanner 20 in the confined space 30 also places the scanner 20 in close proximity to the print side 6 of the labels 2 with an unobstructed, substantially "straight-on" scan field 22, resulting in more accurate barcode scans. For the foregoing reasons, this space 30 provides the scanner 20 with a favorable scanning environment. Moreover, the confined space 30 can allow consistent location of the scanners 20 with respect to a multiple labeling devices 10 in a high-volume labeling system, such as in a fulfillment center.

The scanner 20 includes one or more scanning elements 24, such as an array 26 of scanning elements 24 (see FIGS. 3A through 4B), each configured to obtain optical data from the printed barcodes 4 as they pass within the scan field 22. The optical data can include light intensity, such as the relatively low and high light intensity regions reflected by the barcode lines 5 and the intervening spaces 7, respectively. The scanner 20 can aggregate the optical data from each of the one or more scanning elements to generate aggregated barcode scan data (also referred to herein simply as "barcode scan data") for each scanned barcode and transmit the barcode scan data to the module processor 102 for verification of the barcode readability and/or accuracy. If the barcode 4 is determined readable and/or accurate, the module processor 102 instructs the applicator 14 to tamp the label 2 to the package 3. If the barcode 4 is determined unreadable and/or inaccurate, the module processor 102 can cause the labeling device 10 to discard the defective label 2 (such as by advancing the defective label 2 along the direction of travel T1 beyond the tamp head 15 or by instructing the tamp head 15 to perform a partial tamp that ejects the defective label 2, by way of non-limiting examples). In this manner, the labeling device 10 is configured to prevent or at least reduce the likelihood of labeling packages with defective barcodes. A more detailed description of the barcode verification process is provided below.

It is to be appreciated that the labeling device 10 can be a current labeling device that is reconfigured and/or retrofitted with the scanners 20 described herein. By way of a non-limiting example, the labeling device 10 can be a high-speed, high-volume, thermal transfer label printer/applicator, such as the CTM 3600a-PA Series dual action tamp (DAT) printer applicator produced by CTM Labeling Systems of Salem, Ohio, which employs for the printer 12 a ZE500™ Series print engine produced by Zebra Technologies of Lincolnshire, Ill., and which is reconfigured and/or retrofitted with the scanner 20 positioned between in the confined space 30 between the print engine and the applicator 14 in the manner described above. It is to be appreciated that other current labeling devices can be reconfigured and/or retrofitted with the scanners 20 described herein.

Figure 4A:
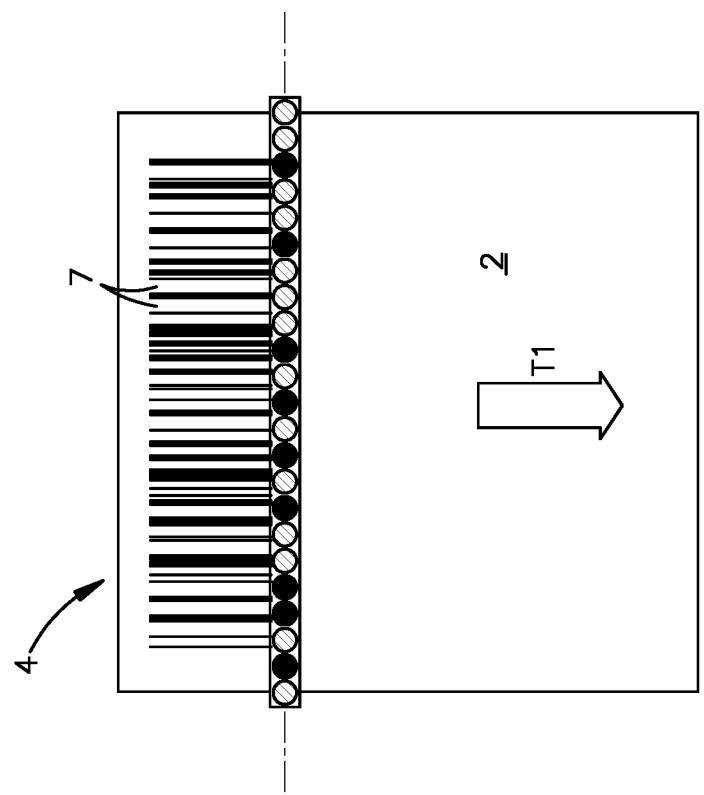
FIG. 4A shows a plan view of barcode scanning elements oriented in relation to the barcode of a shipping label printed in a second format different than the format illustrated in FIGS. 3A through 3B, according to an embodiment of the present disclosure.
Figure 4B:
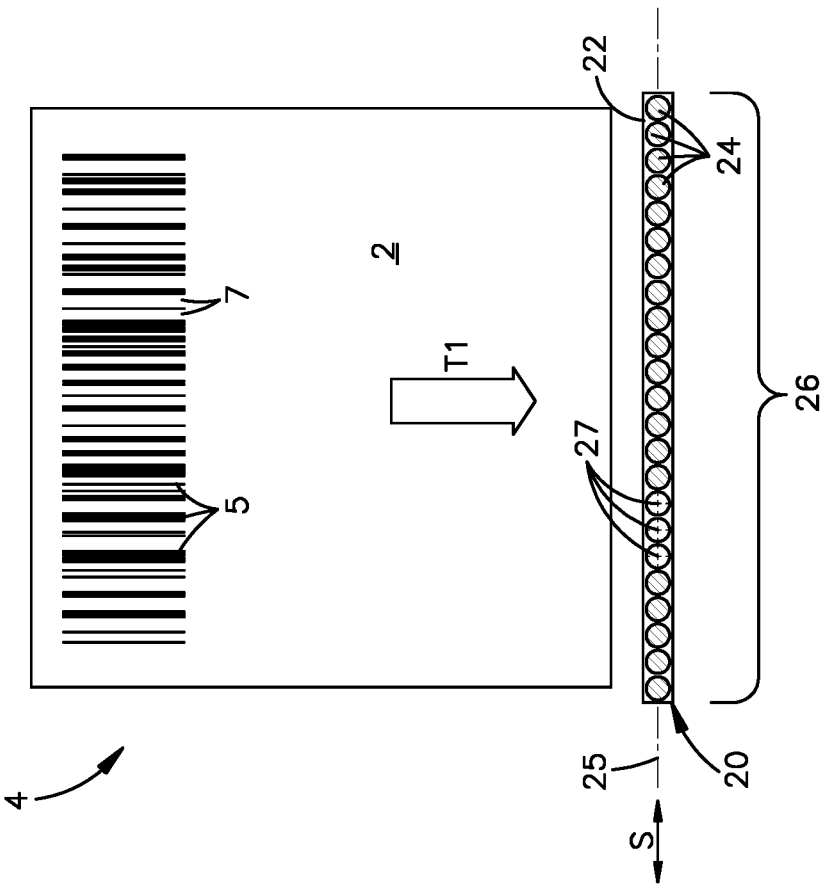
FIG. 4B shows a plan view the barcode scanning elements in scanning alignment with a portion of the barcode illustrated in FIG. 4A.

It is to be appreciated that the embodiments disclosed herein can be configured to scan the barcode 4 satisfactorily regardless of the whether the barcode 4 is printed in a "portrait" layout, as shown in FIGS. 3A and 3B, in which the labeling device 10 directs the printed labels 2 such that the barcode lines 5 are oriented along the direction of travel T1, or a "landscape" layout, as shown in FIGS. 4A and 4B, in which the labeling device 10 directs the printed labels 2 such that the barcode lines 5 are oriented perpendicular to the direction of travel T1. Most prior art barcode printers, including the ZE500™ Series print engine described above, print barcodes in the aforementioned portrait layout.

Referring now to FIGS. 3A through 4B, the scanner 20 can include a plurality of scanning elements 24 arranged in an array 26. The scanner 20 is preferably a fixed line scanner (also referred to as a "line scanner"). Thus, the scanning elements 24 are substantially aligned along a scan axis 25. Moreover, each scanning element 24 can define a respective element scan axis 27 extending linearly from the respective scanning element 24, such that the scan axes 27 of the scanning elements 24 in the array 26 are parallel with each other and aligned along the linear scan direction S, which is substantially perpendicular to the scan axes 27 of the scanning elements 24. The scanner 20 can be a charge-coupled device (CCD) type barcode scanner, although other line scanner types as well as 2D scanner types are within the scope of the present disclosure.

For both portrait and landscape barcode printing with the labeling devices 10 described herein, the printed label 2 will advance along the direction of travel T so that the barcode 4 enters the scan field 22, such as by intersecting the scan axis 25, at which time each of the scanning elements 24 can measure the intensity of light at the location on the label 2 intersected by the respective element scan axis 27. As described above, the scanner 20 can aggregate the light intensity data measured by each of the scanning elements 24 to generate barcode scan data for the barcode 4 and transmit the barcode scan data to the module processor 102 for verification of the barcode readability and/or accuracy.

Barcode printing in the landscape format will now be described with reference to FIGS. 3A and 3B. As the barcode 4 advances through the scan field 22 in the landscape format, each scanning element 24 that intersects the barcode 4 will scan each line 5 and space 7 of the barcode 4 in succession. Thus, each scanning element 24 that intersects the barcode 4 will advantageously scan the entire barcode 4 (if it is a 1D barcode). It is also to be appreciated that printing the barcode 4 in the landscape format advantageously provides that each barcode line 5 and intervening space 7 that passes through the scan field 22 intersects a significantly higher number of the element scan axes 27 (i.e., each barcode line 5 is scanned by significantly more scanning elements 24) than in the portrait layout. Thus, printing and scanning barcodes in a landscape layout can provide a high scan resolution for each barcode line 5 and space 7.

It should be appreciated, however, that printing and scanning in the landscape layout causes the scanner 20 to scan each barcode line 5 and space 7 one at a time as the label 2 advances through the scan field 22. As a result, each barcode line 5 resides in the scan field 22 for a shorter duration than in the portrait format (unless the print speed is reduced, which can be undesirable, particularly for high-speed, high-volume printing applications). Thus, the scanning elements 24 can be programmed to scan at a higher refresh rate (i.e., record more measurements over a duration of time) in landscape printing than in portrait printing.

Moreover, because the scan data pertaining to the thickness of each line 5 and space 7 of the barcode 4 become a function of the print rate in landscape barcode printing (i.e., the measured thickness of each line 5 and space 7 is also a function of how quickly or slowly the barcode passes through the scan field), the labeling device 10 can include a feedback mechanism for measuring and/or calculating the print rate of each label print and transmitting data pertaining to the print rate (such data is referred to herein as "print rate data") to the module processor 102, which can use the print rate data (such as in an algorithm together with the raw barcode scan data provided by the scanner 20) to calibrate the barcode scan data for use in the barcode verification process. One example of such a feedback mechanism is a position encoder, such as an absolute rotary position encoder coupled to the drive roller of the printer 12, whereby absolute position data with respect to time can be transmitted to the module processor 102 which can use this data to calculate the print rate and thus calibrate the barcode scan data accordingly. Additionally or alternatively, an active sensor can be employed to measure and/or calculate the print rate and transmit print rate data to the module processor 102. Furthermore, because the printer 12 may have a tendency to accelerate printing at the commencement of a label print and decelerate printing at the conclusion of the label print (thus resulting in an uneven print rate) the feedback mechanism and/or sensor can be configured to provide print rate data in real time for calibration of the barcode scan data.

It should be appreciated that, even considering the aforementioned challenges involved with landscape barcode printing, the higher scan resolution of each barcode line 5 and space 7 scan can allow for higher print rates relative to portrait format scanning. These higher print rates allowed by landscape printing can be particularly advantageous in high-speed, high-volume label printing processes such as those for use in a fulfillment center.

Another advantage of landscape label printing with the labeling devices 10 described above is that, because the print rate is measured and included in the algorithm used to translate the barcode data, a print rate anomaly (such as an acceleration or deceleration of the print rate beyond the printer's intended tolerances), such as a type causing one or more barcode lines 5 to have an incorrect thickness, can be accounted for in the calibrated barcode scan data due to the scan rate data used in the calibration. Additionally, the module processor 102 can be configured to identify, log, and analyze such print rate anomalies in a supplemental self-check of the printer 12. Moreover, when a print rate anomaly is identified, the module processor 102 can assess whether the raw barcode scan data is consistent with the anomalous print rate, and if consistent, processor 102 can further analyze whether the remainder of the printed barcode is sufficiently readable and/or accurate for successful package routing through the fulfillment center and beyond. The module processor 102 can use this further analysis to determine whether the affected label 2 should be ejected or whether it can be applied to the associated package 3. Moreover, if the module processor 102 determines that the barcode 4 will not be used outside the fulfillment center or outside the network governed by the fulfillment center control system 200, the processor 102 can elect to apply the affected label 2 to the associated package 3 and alert downstream processes and/or scanning stations in the fulfillment center or network of the affected label 2 and optionally provide supplemental and/or corrective information to such downstream elements allowing them to satisfactorily scan the affected barcode 4. Thus, the labeling devices 10 described herein can perform a significantly "smarter" barcode verification process than other types of barcode printing and verifying devices.

Referring now to FIGS. 4A and 4B, it is to be appreciated that printing the barcode 4 in the portrait format also provides certain advantages, one such being that each line 5 resides within the scan field 22 for a longer duration as the label 2 advances along the direction of travel T1. Additionally, because the barcode lines 5 and spaces 7 are elongate along the direction of travel T1, each scan element 24 is likely to measure a consistent light intensity regardless of print rate as the barcode 4 passes through the scan field 22 (unless the scan element axis 27 of a particular scanning element 24 is located at the edge of a barcode line 5). For this reason, the scanning accuracy of the array 26 of scanning elements 24 is generally not affected by the print rate or variations thereof. Thus, the embodiments printing in portrait format need not employ a feedback mechanism or sensor 40 for measuring the print rate. However, the scanner 20 used with portrait label printing may provide less resolution for each barcode line 5 as a result of each line 5 being intersected by fewer scan axes 27 relative to the landscape format. The resolution can be improved by employing finer and/or more densely arranged scanning elements 24 in the array 26. Moreover, the scanner 20 used with portrait label printing also requires a longer scan line to span the width of the barcode 4. Thus, the scanner 20 for portrait barcode scanners may require more scanning elements 24.

It is to be appreciated that the scanner 20 can be located at other positions with respect to the printer 12 and/or tamp head 15. For example, as shown in FIG. 5, the scanner 20 can be located below and/or behind the tamp head 15. In such embodiments, the tamp head 15 can have a portion, such as a central portion 15a, that is transparent or hollow so as to allow the scanner 20 to effectively scan "through" the tamp head 15. Alternatively, the scanner 20 can be affixed to the tamp head 15 itself, such as to an upstream region of the tamp head 15 with respect to the direction of travel T1. Such a location is beneficial because it provides a direct, close-proximity, unobstructed view of the barcodes 4 as they pass through the scan field 22, which provides enhanced scan resolution. However, the repeated tamping motion of the tamp head 15 can necessitate that a robust scanner 20 be employed, such as one configured for repeated motion without experiencing damage to sensitive scanning elements and other electrical components. In yet other embodiments, the scanner 20 can be located and oriented to face the adhesive side 8 of the label 2, particularly if the label 2 is sufficiently thin and/or semi-transparent to provide adequate scanning resolution of the barcode 4 through the label 2.

The embodiments of the present disclosure set forth above can provide significant cost savings for fulfillment center packaging, labeling, and/or downstream processes. For example, package labeling systems and processes utilizing state-of-the-art barcode labeling devices, even high-speed, high-volume, thermal transfer printer/applicators (such as the CTM 3600a-PA printer applicator described above) currently require expensive external barcode scanners that tend to have limited service lives due to exposure to one or more of the deleterious environmental factors described above, but are also limited by their mounted distance from the printed barcodes as well having a scan field downstream of the tamp head, meaning that their barcode scan and verification process, without more, does not prevent inaccurate or unreadable barcodes from being applied to the packages. Thus, these systems by themselves do not prevent the downstream problems associated with faulty barcodes described above. An illustrative example of a high-resolution barcode scanner used with such systems is a DataMan 262 Series optical barcode scanner produced by Cognex Corporation of Natick, Mass., which has a unit price in a range of about $1,000. By locating the barcode scanner much closer to the printed barcodes, such as in the substantially protected environment between the print engine 12 and the tamp assembly 16 of a labeling device 10, which also offers an unobstructed view of the barcode and is upstream of the tamp head, a much less expensive barcode scanner can be employed that will also provide significant improvements to barcode scan quality, as well as require less downtime for service, repair, and/or adjustment, and have a longer service life. Such barcode scanners can be purchased at a unit price in a range of $300. Thus, for the foregoing reasons, the savings from employing the labeling devices 10 described herein at industrial scales in one or more fulfillment centers can be significant. Additionally, because the labeling devices 10 described herein provide faster cycle times by performing the barcode scan and verification process concurrently (i.e., in parallel) with printing, these labeling devices 10 provide higher throughput, efficiency, and productivity, which can provide significant increases in profits, particularly when implemented at industrial scales.

It is also to be appreciated that although the embodiments set forth above are described primarily with reference to fixed line scanners, other types of scanners can be employed for scanning the barcodes. For example, 2D imaging devices can be employed, such as digital cameras, including 6 inch and/or 4 inch digital cameras, as well as CMOS image sensors and the like. In additional embodiments, such as those employing a thermal transfer printer, a thermal scanner, such as an infrared scanner, is within the scope of the present disclosure. The scanner for use in a particular embodiment can be selected based on a variety of factors, such as focal distance, focal width, and mounting position relative to the various components of the labeling device, such as the printer and the tamp head, for example.

It is yet also to be appreciated that because the fixed line scanners 20 described above are configured to scan the barcodes 4 in real time as they advance across the linear scan axis 25, these scanners 20 can additionally or alternatively be configured to scan 2D barcodes, such as QR codes, for example. It is further to be appreciated that the fixed line scanners 20 described above with reference to FIGS. 3A through 4B can be configured to measure the precise time intervals between beam emission from the scanner 20 and reflection back to the scanner 20 at each element scan axis 27 intersecting the linear scan axis 25 in a manner capable of sensing texturing of the barcode 4. Thus, the scanners 20 of the present disclosure can be configured in such manner to be capable of scanning 3D barcodes as they are advanced across the linear scan axis 25.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated. Also, the present invention is not intended to be limited by any description of drawbacks or problems with any prior art device.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. An integrated barcode printing and scanning mechanism, comprising:
   a printer configured to print labels each having a barcode on a print side of the label and a layer of adhesive on an adhesive side of the label opposite the print side, wherein the barcode printing and scanning mechanism is configured to direct each printed label in a direction of travel;
   a tamp head assembly having a tamp head that is configured to press the label against a package while the package resides in a package labeling zone adjacent the tamp head so that the adhesive side adheres to the package and the print side is visible from an exterior of the package; and
   a barcode scanner located downstream of the printer and facing the print side of each label, wherein the barcode scanner is configured to scan the barcode of each label prior to each label being pressed against the package by the tamp head, wherein the barcode scanner is configured to transmit scan data to a processor in communication with the barcode scanner for verifying the barcode on each label.

2. The integrated barcode printing and scanning mechanism of claim 1, wherein the barcode scanner is a fixed line scanner.

3. The integrated barcode printing and scanning mechanism of claim 1, wherein the barcode scanner is located downstream of the printer and upstream of the tamp head with respect to the direction of travel.

4. The integrated barcode printing and scanning mechanism of claim 3, wherein the barcode scanner is located in a controlled environment between the printer and the tamp head assembly.

5. A labeling device, comprising:
   a printer configured to print labels each having a barcode on a print side of the label opposite an adhesive side of the label, wherein the printer is configured to direct each printed label in a direction of travel;
   a label applicator located downstream of the printer with respect to the direction of travel; and
   a barcode scanner located downstream of the printer with respect to the direction of travel, wherein the barcode scanner is configured to scan the barcode of each label before the label applicator presses the label against a package.

6. The labeling device of claim 5, wherein the barcode scanner is located in a space defined between the printer and the label applicator with respect to the direction of travel.

7. The labeling device of claim 5, wherein the barcode scanner faces the print side of each label.

8. The labeling device of claim 5, wherein the barcode scanner is a line scanner.

9. The labeling device of claim 8, wherein the line scanner includes a plurality of scanning elements each configured to measure light intensity along a scan element axis, wherein the scan element axes of each of the scanning elements are parallel and are intersected by a single linear axis oriented perpendicular to the scan element axes.

10. The labeling device of claim 9, wherein the labeling device is configured to direct each printed label such that elongate lines of the barcode are oriented along the direction of travel.

11. The labeling device of claim 10, wherein each of the lines of the barcode is intersected by a multiplicity of the scanning elements as the respective label passes in front of the scanning elements.

12. The labeling device of claim 9, wherein the labeling device is configured to direct each printed label such that lines of the barcode are oriented perpendicular to the direction of travel.

13. The labeling device of claim 12, further comprising a sensor configured to measure the print rate of the labels and communicate print rate data to a processor.

14. The labeling device of claim 13, wherein the sensor is a rotary encoder rotationally coupled to a drive roller of the printer.

15. The labeling device of claim 5, wherein the printer is a thermal transfer printer.

16. A method of verifying barcodes on printed labels intended for affixation to packages, the method comprising:
    printing a plurality of labels with a printer, each printed label of the plurality of labels having a barcode on a print side of the label and a layer of adhesive on an adhesive side of the label opposite the print side;
    directing each label from the printer in a direction of travel toward a label applicator;
    scanning the barcode on each label with a barcode scanner so as to generate scan data for verifying the accuracy of the printed barcode; and
    after the scanning step, advancing a tamp head of the label applicator against each label verified accurate, thereby pressing each verified label against an associated package.

17. The method of claim 16, wherein the barcode scanner is located between the printer and the tamp head with respect to the direction of travel.

18. The method of claim 16, wherein the scanning step comprises:
    scanning the barcode along a linear scan axis oriented parallel with elongate lines of the barcode;
    advancing the elongate lines of the barcode in succession across the linear axis during the scanning step; and
    transmitting the generated scan data to a processor configured to interpret the scan data for verifying the accuracy of the printed barcode.

19. The method of claim 18, further comprising:
    obtaining print rate measurements from a sensor configured to measure movement of a driver of the printer; and
    transmitting data representing the print rate measurements to the processor for calibrating the scan data as a function of a print rate of the printer.

20. The method of claim 16, wherein the scanning step comprises:
    scanning the barcode along a linear axis oriented perpendicular to elongate lines of the barcode;
    advancing each elongate line of the barcode concurrently across the linear axis during the scanning step; and
    transmitting the generated scan data to a processor configured to interpret the scan data for verifying the accuracy of the printed barcode.

\* \* \* \* \*